United States Patent [19]
Ookouchi et al.

[11] Patent Number: 5,252,130
[45] Date of Patent: Oct. 12, 1993

[54] APPARATUS WHICH COMES IN CONTACT WITH MOLTEN METAL AND COMPOSITE MEMBER AND SLIDING STRUCTURE FOR USE IN THE SAME

[75] Inventors: Takahiko Ookouchi, Katsuta; Hiromi Kagohara, Hitachi; Hiromu Hama, Katsuta; Mitsuo Nakagawa, Mito; Hitoshi Okoshi, Hitachi; Yoshitaka Nakayama, Hitachiota, all of Japan

[73] Assignee: Hitachi, Ltd., Tokyo, Japan

[21] Appl. No.: 583,131

[22] Filed: Sep. 17, 1990

[30] Foreign Application Priority Data

Sep. 20, 1989 [JP] Japan .................... 1-242161

[51] Int. Cl.$^5$ ............................................ B05C 3/00
[52] U.S. Cl. ..................................... 118/423; 118/419
[58] Field of Search .......................... 118/419, 425; 384/907.1; 29/116.1, 127, 132

[56] References Cited

U.S. PATENT DOCUMENTS

| | | | |
|---|---|---|---|
| 2,950,097 | 8/1960 | Tohir | 29/126 |
| 4,634,300 | 1/1987 | Takebayashi et al. | 384/548 |
| 4,876,875 | 10/1989 | Bruggeman et al. | 29/132 |
| 5,072,689 | 12/1991 | Nakagawa et al. | 118/419 |

FOREIGN PATENT DOCUMENTS

| | | |
|---|---|---|
| 63-73349 | 5/1988 | Japan . |
| 63-95658 | 6/1988 | Japan . |
| 63-106561 | 7/1988 | Japan . |
| 1-159359 | 6/1989 | Japan . |
| 1-127649 | 8/1989 | Japan . |

Primary Examiner—W. Gary Jones
Assistant Examiner—Brenda A. Lamb
Attorney, Agent, or Firm—Antonelli, Terry, Stout & Kraus

[57] ABSTRACT

The invention relates to a molten metal plating apparatus including a roller rotatably supported by a bearing in a molten metal bath, the roller having a shaft sliding portion, the bearing having a sliding portion, both the shaft sliding portion and the sliding portion being made of ceramic sintered body, at least one of both the shaft of the roller and the bearing being made of a ceramic sintered body containing a solid lubricating material. The invention also relates to a die casting machine having a sleeve and a plunger tip both made of ceramic sintered bodies at least one of which contains a solid lubricating material. The bearing for the roller, the sleeve and the tip may be formed of a composite body having a ceramic sintered body portion and and a metal portion secured and fitted thereto by an intermediate member which is elastically and plastically deformed at the time of the usage. The composite structure formed by fitting is usable for other applications.

4 Claims, 4 Drawing Sheets

APPARATUS WHICH COMES IN CONTACT WITH MOLTEN METAL AND COMPOSITE MEMBER AND SLIDING STRUCTURE FOR USE IN THE SAME

BACKGROUND OF THE INVENTION (1) Field of the Invention

The present invention relates to a continuous molten metal plating apparatus and a die casting machine, and, more particularly, to a roller bearing apparatus for continuous molten metal plating bath, a sleeve and a tip in the plunger portion of a die casting machine and composite member and sliding structure for use in the apparatus, the continuous molten metal plating apparatus exhibiting an excellent characteristic against corrosion occurring due to the molten metal and against abrasion occurring due to the load from the roller shaft.

(2) Description of the Prior Art

Hitherto, stainless steel, high chrome steel and hard metal alloy exhibiting excellent corrosion resistance have been used, in the form of built-up welding or a sleeve, in a roller bearing for continuous molten metal plating bath. However, a problem arises in that any of the above-described materials have encountered abrasion or damage in, for example, a zinc plating bath in about one week. As a result, backlash takes place between the roller shaft and the bearing, causing the plating apparatus to be vibrated, with the result that plating characteristics are critically deteriorated. It has been found that the reason for this is that the corrosion of stainless steel, high chrome steel, hard metal alloy or the like, which though exhibits a relatively excellent corrosion resistance, due to the molten metal cannot be prevented completely. Thus, when the roller bearing slides, there occurs at the same time both friction and corrosion abrasion due to the molten metal, so that the quantity of the abrasion is increased. In particular, it has also been found that if the abrasion progresses to a certain degree, corrosion pits occur in the surface of the roller shaft and in the surface of the roller bearing, further increasing the frictional abrasion.

In order to prevent the abrasion of the roller bearing, a material having an excellent corrosion resistance against the molten metal must therefore be selected. Some types of ceramics exhibit a characteristic capable of substantially resisting the corrosion due to the molten metal. Therefore, it is preferable that the ceramics of the type described above be employed as a material for making the roller bearing for the molten metal plating bath.

An example of a technology, in which ceramics are employed in a material for making the roller bearing for the continuous molten metal plating bath, has been disclosed in Japanese Utility Model Laid-Open No. 63-73349. According to the above-described publication, a metal sleeve having the outer surface to which ceramics are applied via a heat resistant buffer sheet is fitted to the roller shaft. Furthermore, the outer surface of the above-described metal sleeve is held by a bearing metals the inner surface of which is coated with ceramics via another heat resistant buffer sheet.

However, the above-described conventional structure has encountered problems in that seizure occurs due to the sliding of the ceramic members, and cracks and fractures of the ceramics occur due to the non-uniform contact of the ceramic members because the types of ceramics and the combination of the types of ceramics have not been taken into consideration in the prior art.

That is, although ceramics have an excellent corrosion resistance against molten metal, its wettability is insufficient. It has been found that no lubrication is performed by the molten metal on the sliding surface, and dry abrasion thereby occurs where ceramics are employed as the material for making a sliding member of the roller bearing for the molten metal plating bath. As a result of a study of the friction coefficients and the threshold surface pressure occurring between typical ceramics, it has been found that the ceramics are apt to encounter cracks and fractures due to seizure and galling if the surface pressure exceeds the threshold level. The reason for this lies in that the friction coefficient is too high to be used as sliding members, and the threshold surface pressure is too low with respect to a combination of silicon carbide and silicon nitride ceramics which have been known to have excellent corrosion resistance and abrasion resistance. It has been considered that the sliding surfaces being in uniform contact with each other cannot be manufactured even if the accuracy for machining the sliding surfaces is improved as much as possible, in the case of ceramics having a high Young's modulus, with the result that local friction occurs due to a slight undulation or an eccentricity. Therefore, when ceramics are employed to make the roller bearing for the molten metal plating bath, the kind of the ceramics must be selected to have both an excellent corrosion resistance against molten metal and a small friction coefficient as well as corrosion against molten metal. In addition a uniform contact sliding surface must be formed through the initial abrasion by the selection of the ceramics.

Furthermore, in the publication of the technology no method of coating the ceramics is disclosed. In addition, the stress occurring when using the roller bearing and fitting the ceramics has not been satisfactorily removed, causing the ceramics to encounter cracks or the like.

That is, according to the above-described conventional structure, a heat resistant material such as an alumina sheet or carbon fiber is used as a stress buffer at the time of the fitting of the ceramics. However, since the above-described heat resistant material has poor elastic deformation capability and plastic deformation capability and since deformation stress exceeds the bending and the tensile strength of the ceramics, there are obtained no effect desired for the stress buffer. In addition, since the ceramics are integrally formed, the structure thus constituted is apt to be fractured by the load acting on the bearing or by the bending stress due to the thermal deformation in the case where the roller shaft is a large size.

Hitherto, stainless steel, high chromium steel and metal materials subjected to nitriding have been employed as the sleeve and the tip of the plunger portion of a die casting machine since the above-described material has a relatively excellent corrosion resistance. However, in a case of, for example, an Al-die casting machine, these materials encounter a problem in that the tip is worn and damaged in about one month and the sleeve is worn and damaged in about three months. As a result, backlash occurs between the sleeve and the tip, causing such problems as penetration of the molten Al and an inferior run of the molten Al. Furthermore, a large quantity of lubricating oil has been used for the purpose of preventing the abrasion damage and galling.

however, there occur mold cavities due to the containment of the lubricating oil.

It has been found that the reason for the above-described abrasion damage lies in that corrosion of metal having a relatively excellent corrosion resistance due to the molten metal cannot be completely prevented. Therefore, at the time of sliding of the sleeve and chips, there occur at the same time both the abrasion due to the corrosion caused by the molten metal enhances the abrasion due to the friction, with the result that the quantity of the abrasion is increased.

Therefore, a material having an excellent corrosion resistance against molten metal and excellent abrasion resistance must be selected in order to reduce the quantity of abrasion at the time of the sliding of the sleeve and the tip. In order to meet the above-described conditions, it is preferable that ceramics be selected.

A structure in which ceramics have been used in the sliding portion of the sleeve and the tip of the plunger portion of a die casting machine has been disclosed in Japanese Utility Model Laid-Open No. 63-106561 and another structure has been disclosed in Japanese Utility Model Laid-Open No. 1-127649. The structures thus disclosed are characterized in that ceramic sleeves are shrinkage-fitted to the inner surfaces of the metal sleeves.

However, another problem arises in that the abrasion due to a lapse of time cannot be satisfactorily minimized by using ceramics to make the sleeve and the tip for the purpose of improving the corrosion resistance against the molten metal and the abrasion resistance.

Furthermore, according to the above-described conventional structure, no means has not been employed so as to remove the stress occurring at the time of fitting the ceramic sleeve onto the metal sleeve. Therefore, there has been fear of problems in terms of cracks and fracture of the ceramic sleeve. That is, according to the above-described conventional structure, the ceramic sleeve is directly shrinkage-fitted to the metal sleeve. Therefore, a local excessive stress are apt to occur due to a slight eccentricity and undulation caused at the time of machining the ceramic sleeve and the metal sleeve. As a result, a problem arises in that the ceramic sleeve is apt to be cracked or fractured. In addition, cracks or fracture is apt to occur by the bending stress caused by the thermal deformation or the like during a heat cycle at the time of the usage.

SUMMARY OF THE INVENTION

An object of the present invention is to use ceramics as the sliding member of a bearing for a roller. More particularly, an object of the present invention is to provide a molten metal plating apparatus, a manufacturing method therefor and a bearing for a roller, the corrosion resistance and the abrasion resistance of which are improved by selecting the combination of kinds of the ceramics and by employing a structure capable of buffering the stress at the time of the fitting so that the service life is increased by the decrease of the downtime thereof thereby improving the manufacturing efficiency and reducing both the defects of the steel plate and the period of the interchanging work.

Another object of the present invention is to provide a composite member and a manufacturing method therefor, in which composite member two members which are respectively made of different materials can be firmly and strongly fitted to each other without fear of fracture.

A further object of the present invention is to use ceramics having solid lubricating characteristics in sliding portions of a sleeve and a tip for a die casting machine. More particularly an object of the present invention is to provide a die casting machine, a sleeve and a tip therefor and a manufacturing method therefor with which the corrosion resistance and the abrasion resistance can be improved by selecting the combination of the kinds of the ceramics and by employing a structure capable of buffering the stress at the time of the fitting so that the service life is increased, and in which the quality of the die cast product can be improved by reducing the quantity of oil necessary for lubricating.

An aspect of the present invention lies in a molten metal plating apparatus having a rotatable roller supported by a bearing in a molten metal bath, the molten metal plating apparatus comprising a sliding portion of the roller and a sliding portion of the bearing both of which portions are made of ceramic, at least one of the shaft of the roller and the bearing being made of ceramic having solid lubricating property.

In a continuous molten metal plating apparatus having a sink roller and a support roller, both rotatably supported by a bearing in a molten metal bath so as to be rotated, the present invention is applied to the sliding portion of the roll shaft and to the sliding portion of the bearing with respect to at least either one of the sink roller and the support roller.

The present invention is characterized in that at least one of the sliding portion of the roll shaft and the sliding portion of the bearing is made of a composite member formed by fitting ceramics and a metal member to each other, an intermediate member being disposed between the ceramic and metal members which intermediate member can be elastic-plastically deformed at a stress less than the fracture strength of the ceramics, the intermediate member being able to be elastic-plastically deformed at the temperature of the use thereof and elastic-plastically deformed due to the difference in the thermal expansion between the members, the intermediate member being disposed in such a manner that a space in which the intermediate member can be deformed is provided, both the ceramic and the metal member being integrated.

At least either one of the sliding portion of the roller shaft and the sliding portion of the bearing with respect to at least one of the sink roller and the support roller is formed by a composite member formed by fitting ceramics and a metal member, and the intermediate member is, similarly to the above-described structure, disposed between the fitted members.

An aspect of the present invention lies in a method of manufacturing a molten metal plating apparatus having a roller rotated and supported by a bearing in a molten metal bath, the method of manufacturing a molten metal plating apparatus comprising the steps of: forming at least one of the sliding portion of the roller shaft and the sliding portion of the bearing by use of composite member made by fitting a ceramic and a metal member; disposing an intermediate member between the ceramic and metal member which intermediate member can be deformed at a stress less than the fracture strength of the ceramic, the intermediate member being disposed in such a manner that a space is provided in which the intermediate member can be elastic-plastically deformed due to the difference in the thermal expansion between the members in a state of at least the usage temperature, before the ceramic and metal member are fitted to one another.

The present invention relates to rolling roller constituted by fitting onto a solid metal member having both a shaft portion, and a body portion a cylindrical member the composition of which is different from that of the metal member, an intermediate member being disposed between the members and being able to be elastic-plastically deformed at a stress less than the fracture strength of the cylindrical member, the intermediate member being in a space in which it can be deformed due to the difference in the thermal expansion between the members in a state of at least the usage temperature.

An aspect of the present invention lies in a composite member made of two members fitted to each other which are made of material different to each other, the composite member comprising: an intermediate member disposed between the two members which intermediate member can be elastic-plastically deformed at a stress level less than the fracture strength of the two members, the intermediate member being disposed in a space in which it can be deformed due to the difference in the thermal expansion between the two members in a state of at least the usage temperature.

Regarding the above-described materials, the thermal expansion coefficient of the two members are different from each other, at least one of which two members is a cylindrical member, and an intermediate member is, similarly to the above-described structure, disposed between the cylindrical member and another member, so that the intermediate member can be deformed or preferably elastic-plastically deformed at a stress level less than the fracture strength of the above-described two members.

An aspect of the present invention lies in a composite member constructed by both a solid metal member and a cylindrical member of a ceramic sintered body fitted to at least a portion of the outer periphery of the metal member, the composite member comprising an intermediate member which is, similarly to the above-described structure, disposed between the metal and cylindrical members and which can be elastic-plastically deformed at a stress level lower than the fracture strength of the ceramic sintered body.

An aspect of the present invention lies in a method of manufacturing a composite member constructed by fitting at least two outer and inner members made of different materials, the method of manufacturing a composite member comprising the steps of: disposing an intermediate member in a restriction portion at which the inner member is restricted by the outer member, which intermediate member can be deformed at a stress level lower than the fracture strength of the two members, the intermediate member being disposed so as to be elastic-plastically deformed due to the difference in the thermal expansion between the members in a state of at least the usage temperature and to form a space in which the intermediate member can be deformed; and fitting the members and the intermediate member to one another.

Regarding the intermediate member, a metal wire is used in such a manner that it is wound to provide a space in which it can be elastic-plastically deformed from a linear contact state to a plane contact between the two members in at least the usage temperature state. The size of the space must correspond to 10% or less of the quantity of the elastic-plastic deformation in the usage temperature state. Furthermore, the space must have a size in which the intermediate member can be deformed in a complete usage temperature state after the intermediate member had been elastic-plastically deformed.

The above-described objects of the present invention can be achieved by a structure in which the ceramics are fitted to the sliding portion of the outer periphery of the metal roller shaft and to the sliding portion of the inner periphery of the bearing, one of the ceramics being provided with a high strength and high hardness and another of the ceramics being provided with solid lubricating property. It is preferable that both types of the ceramics have corrosion resistance against the molten metal (Al and Zn). Furthermore, it is preferable that the high strength an hardness ceramic exhibits a tensile strength of 200 MPa or more and a hardness of 10 GPa or more in Vickers hardness and that this ceramic is a sintered body of carbide, a nitride, an oxide, a boride, or an oxy-nitride or a composite sintered body containing these materials as the main components thereof. As the ceramic having the solid lubricating property, such ceramic is preferable as containing, in their sintered body and in a dispersed manner, a material exhibiting an excellent solid lubricating property such as carbon powder and carbon fiber. However, a similar effect can be obtained from a BN or graphite sintered body.

It is necessary for the ceramics to include no metal corroded by such molten metal as Zn, Al and Sn. Furthermore, the ceramics must have a characteristics with which no leakage can be taken place.

Furthermore, as described above, the above-described objects can be achieved by the structure in which both the roller shaft and the bearing are respectively arranged to have a stress-buffering structure.

That is, the ceramics cylindrical body is fitted to the metal roller shaft, and at the time of the fitting a metal material having a low yield point and being able to be elastic-plastically deformed at a stress level lower than the fracture strength of the ceramics must be disposed between the metal roller shaft and the ceramic cylindrical body. In the case where the size of the ceramics sintered body is large, a satisfactory reliability against various types of stress can be obtained by fitting a plurality of ceramics divided in the axial direction or radial direction.

As for the bearing, a plurality of ceramics divided into blocks are fitted to the inner periphery of the metal bearing in the case where the size of the ceramics to be fitted is large. The ceramics can be effectively installed in such a manner that the block-shaped ceramics are placed in a dovetail groove formed in the inner periphery of the metal bearing and are pushed and fixed through a stress buffering material.

An aspect of the present invention lies in a molten-metal plating system, wherein a steel strip is moved at a high speed so as to be continuously immersed, after the annealing thereof, in a molten metal bath while guided by rollers so as to apply the molten metal and to form a plating layer, the steel strip being moved upward therefrom and a high velocity gas being blown onto the plating layer to control the thickness of the plating layer to a uniform thickness so that molten metal-plated steel strips are continuously produced by use of the same kind steel strip and the same composition of the plating, the molten-metal plating system being characterized in that the roller is supported by a bearing made of a ceramic having solid lubricating particles therein so as to substantially prevent the abrasion of the bearing so that no vibrations of the steel strip moving at high speed occurs substantially immediately after it had been plated by the molten metal, that the tension applied to the steel strip in the direction of the movement is kept to be constant, and that the gas blowing condition is kept to be substantially constant.

An aspect of the present invention lies in a molten-metal plating system, wherein a steel strip is moved at a high speed and is continuously guided and immersed, after being annealed, into a molten metal bath by rollers so that a molten metal of uniform thickness is applied to the steel strip, characterized in that the roller is supported by a ceramic bearing structure having solid lubricating particles so as to substantially prevent the steel strip moving at high speed from vibrating immediately after it had been plated by molten metal, that substantially uniform tension is applied to the steel strip in the direction of the movement for at least two successive days, and that the steel strips of the same type and same plating composition are used for at least two weeks so that the molten metal plating steel plate is continuously manufactured.

An aspect of the invention lies in a molten metal plating system as disclosed above, wherein a coating layer having a constant thickness not more than 50 $\mu$m is formed at least in a period of 2 days by making the condition of gas-blowing constant so that a molten metal-plated steel strip is continuously produced by use of the same kind of steel strip and the same kind of plating metal composition.

An aspect of the present invention lies in a molten-metal plating system, wherein a steel strip is moved at a high speed and is guided and immersed, after being annealed, continuously in a molten metal bath by a roller so as to provide a coating layer on the strip by applying the molten metal thereon, a high velocity gas being blown to the coating layer to control the thickness to a predetermined thickness, after the plated steel strip is moved upward just above the molten metal bath, so that a molten metal-plated steel strip is produced continuously by use of both the same kind of steel strips and the same plating metal composition, such that a bearing for the roller is substantially prevented from being abraded, that vibrations of the steel strip moving at high speed is measured immediately after it had been molten metal-plated, that both conditions for blowing the gas and tension applied to the steel strip in the moving direction are automatically controlled to make them substantially constant.

An aspect of the present invention lies in a continuous molten metal-plated steel strip continuously produced for at least two days by continuously plating a molten metal which the steel strip is provided during the continuous plating thereon with a plating layer having a thickness of 50 $\mu$m and a thickness variation not more than 5 $\mu$m. Regarding the thickness of the plating layer, any one in the various thickness ranges of 2 to 10 $\mu$m, 10 to 20 $\mu$m, 20 to 30 $\mu$m, 30 to 40 $\mu$m, and 40 to 50 $\mu$m can be selected.

In order to achieve the above-described objects, an aspect of the present invention lies in a die casting machine having a sleeve communicated with a metallic mold and a tip which slides within the sleeve so as to push molten metal into the mold, at least parts of the sliding portions of both the sleeve and the tip which parts are in contact with the molten metal being made of ceramics, and at least one of the ceramics being a ceramic having a solid lubricating property.

An aspect of the present invention lies in a die casting machine having a sleeve communicated with a metallic mold and a tip which slides within the sleeve so as to push the molten metal into the mold, at least one of the sliding portions of both the sleeve and the tip being in the form of a laminated structure in which a metal member and a ceramic member are laminated which ceramic member is in contact with the molten metal, and an intermediate member which is plastically deformed at a stress lower than the fracture strength of the ceramic member is disposed at all of or a part of the fitting face defined between the ceramic member and the metal member. In this case, it is preferable that the intermediate member be disposed so as to have a space in which the intermediate member can be deformed due to the difference in the thermal expansion between the members in a state of at least the usage temperature.

An aspect of the present invention lies in a sleeve for a die casting machine, a sliding portion of the sleeve in sliding relation to a tip being made of a ceramic having solid lubricating property.

An aspect of the present invention lies in a tip for a die casting machine, at least a part of a sliding portion of the tip in sliding relation to a sleeve which part come in contact with molten metal being made of a ceramic having a solid lubricating property.

An aspect of the present invention lies in a sleeve for a die casting machine, comprising a metal sleeve portion, a ceramic sleeve portion overlaid on the inner side of the metal sleeve which ceramic sleeve portion is made of a ceramic having a solid lubricating property, and an intermediate member disposed between the two sleeve portions which member is plastically deformed at a stress level lower than the fracture strength of the ceramic sleeve portion.

An aspect of the present invention lies in a tip for a die casting machine, comprising a metal tip portion, a ceramic tip portion disposed in a part of the metal tip portion which part comes in contact with molten metal, which ceramic tip portion is made of ceramic having a solid lubricating property, and an intermediate member interposed at a part or all of the fitting face between the two tip portions which intermediate member is deformed at stress level lower than the fracture strength of the ceramic portion.

An aspect of the present invention lies in a method for manufacturing a sleeve for a die casting machine, comprising the steps of: winding a wire serving as an intermediate member around the outer periphery of ceramic sleeve; and inserting the ceramic sleeve into a metal sleeve having been heated and gradually cooling it so as to shrinkage-fit the two sleeves.

An aspect of the present invention lies in a method for manufacturing a tip for a die casting machine, comprising the steps of: winding a wire serving as an intermediate member around at least a part of the outer periphery of a ceramic tip; and shrinkage-fitting the ceramic tip into a metal tip which has been heated.

The present invention is characterized in that the ceramics are fitted to both the sliding portion of the inner periphery of the sleeve and the sliding portion of the tip, one of the ceramics being of a high strength and high hardness while the other ceramic having solid lubricating property. In addition, both types of the ceramics have corrosion resistance against the molten metal (Al and Zn). Furthermore, it is preferable that the high strength and hardness ceramic exhibits a tensile strength of 200 MPa or more and a hardness of 10 GPa or more in Vickers hardness, and that carbide, a nitride, an oxide, a boride, an oxy-nitride, or a composite ceramic sintered body containing these materials as the main component thereof is employed. As the material having the solid lubricating property, it is preferable that ceramics containing, in their sintered body and in a dispersed manner, a material exhibiting an excellent solid lubricating property such as carbon powder and carbon fiber are employed. However, a similar effect can be obtained by using graphite or fiber reinforced graphite.

As described above, the present invention is characterized in that at least one of the sliding portions of both the sleeve and the tip is made of a composite member constituted by fitting ceramics onto a metal member, and that an intermediate member which is deformed at a stress level lower than the fracture strength of the ceramics is disposed between the ceramic and metal members. That is, in the sleeve, the ceramic is cylindrical and is shrinkage-fitted onto the inner periphery of the metal sleeve portion with a low yield point metal member being interposed between the metal sleeve portion and the ceramic, the metal member being elastic-plastically deformed at a level lower than the fracture strength of the ceramic. For example, in a case where a copper wire is used as the intermediate member, it is wound in such a manner that a space is provided in which the copper wire can be elastic-plastically deformed from a linear contact to a plane contact with each other by the shrinkage fitting between the metal sleeve portion and the ceramic portion. Similarly to the sleeve, the tip is formed by fitting ceramic onto the metal member with an intermediate member being interposed therebetween.

Since the ceramics exhibiting excellent corrosion resistance against molten metal are used in the sliding portion of the roller bearing, the abrasion due to the abrasion corrosion can be minimized. On the other hand, since either one of the members is made of a high strength and hardness ceramic while the other member is made of a material exhibiting solid lubricating property, the friction coefficient can be remarkably reduced and the threshold surface pressure can be remarkably raised as shown in Tables 1 and 2. The above-described effect can be obtained from the solid lubricating action. As a result, cracks of the ceramics due to seizure, galling or the like can be prevented. Furthermore, according to the above-described combination, non-uniform contact due to the undulation or the eccentricity occurring at the time of machining can be removed because the solid lubricating material is worn slightly at the initial stage. As a result, the sliding surface can be made to be in uniform contact therewith and a local abrasion can be prevented. Therefore, the sliding can be performed with sufficient lubrication. Furthermore, since the high strength and hardness ceramics are not substantially worn and their flat and smooth sliding surface can be semi-permanently maintained, the amount of the abrasion of the solid lubricating material can be reduced to 1/10 of the conventional metal combination.

SiC-C and sialon are the same as those according to Example 1 to be described later. Other materials, SiC, $Si_3N_4$, $Al_2O_3$ and $ZrO_2$ are sintered by an ordinary method.

TABLE 1

| Combination of materials | | Friction coefficient (μ) | | |
|---|---|---|---|---|
| Fixed member | Movable member | 0 | 0.5 | 1.0 |
| SiC | SiC | | o | |
| $Si_3N_4$ | $Si_3N_4$ | | | o |
| $Al_2O_3$ | $Al_2O_3$ | | o | |
| $ZrO_2$ | $ZrO_2$ | | | o |
| Sialon | Sialon | | | o |
| SiC—C Composite material | Sialon | o | | |

TABLE 2

| Combination of materials | | Anti-galling threshold surface pressure (kgf/cm²) | | | |
|---|---|---|---|---|---|
| Fixed member | Movable member | 0 | 20 | 40 | 60 |
| SiC | SiC | o | | | |
| $Si_3N_4$ | $Si_3N_4$ | o | | | |
| $Al_2O_3$ | $Al_2O_3$ | o | | | |
| $ZrO_2$ | $ZrO_2$ | | o | | |
| Sialon | Sialon | o | | | |
| SiC—C Composite material | Sialon | | | | o→ |

According to the present invention, a buffer, which can be elastic-plastically deformed at a stress level lower than the fracture strength of the ceramics, is disposed between the ceramics and the metal roller shaft when the ceramics are fitted onto the outer periphery of the metal roller shaft. Therefore, the strain occurring due to the difference in the thermal expansion between the metal roller shaft and the ceramic sleeve in the molten metal bath can be absorbed by the elastic-plastic deformation of the buffer even if the machining tolerances for both the metal roller shaft and the ceramic sleeve are large. Therefore, the ceramics can be fixed to the metal roller shaft without occurrence of cracks or fracture of the ceramic. Furthermore, the residual stress of the ceramic due to the fitting during the usage does not exceed the yielding stress of the buffer (for example, it is several kgf/mm² in the case of copper). Therefore, a satisfactory high margin with respect to the load during the usage can be obtained. Since the effect of the above-described structure can be obtained against an impact load, the structure is optimal when the ceramics are installed to the roller shaft. If the size of the ceramics to be installed is large, it is preferable that the ceramic be divided into a plurality of ceramic sections in the axial direction or the radial direction. As a result, the deformation stress and the impact load acting on the roller shaft can be dispersed. Therefore, the reliability against each of a variety of external forces can be improved. Furthermore, the size of the ceramic can be reduced, causing the manufacturing cost to be reduced.

According to the present invention, a plurality of ceramics are placed in dovetail grooves formed in a metal bearing base and they are abutted and fixed through a stress buffer such as a graphite sheet. Therefore, the load acting on the bearing can be received by the overall surface of the rear side of the ceramics. Furthermore, a reliable roller bearing for receiving impact load and a large load can be obtained since no cracks nor fractures occur in the ceramics.

It is preferable that the above-described material having solid lubricating property is ceramics containing, in its sintered body, a material exhibiting excellent solid lubricating property such as graphite powder, carbon fiber such as $MoS_2$, $WS_2$ and BN or the like by 1 to 50 volume % in a dispersed manner. In particular, it is preferable that the ceramics are silicon carbide containing, in its sintered body, graphite powder the average particle size of which is 50 μm or less or carbon fiber the diameter of which is 150 μm or less by 1 to 70 parts by weight, preferably 15 to 40 wt %, or a combination of silicon nitride and BN. As an alternative, a material consisting of only BN or graphite can be employed. Furthermore, a composite material of graphite and carbon fiber can be used.

It is preferable that the ceramic member fitted to the outer periphery of the roller shaft is in the form of a cylinder, more preferably, a plurality of ceramic portions divided into axial direction are fitted to the roller shaft.

It is preferable that the intermediate member serving as a stress buffer is metal which has a low yielding point and which can thereby be elastic-plastically deformed at a stress lower than the fracture strength of the ceramic, and more particularly, there is used Ti, Au, Ag, Al, Pd, Cu, Ni or, austenitic stainless steel or ferritic stainless steel the hardness of which is 200 Hv or less. The above-described buffer is inserted into the entire face on which the roller shaft and the ceramics come in contact with each other, or it may be cut into elongated members so as to be partially inserted to thereby form a space in the gap so that the intermediate member may be deformed in the space.

In order to easily cause the above-described plastic deformation to occur, the buffer may have a groove or a recess. Alternatively, a fine wire in the shape of a sleeve or a small pipe may be wound or an waveform-plate-like wire or a honeycomb plate-like wire may be employed. Furthermore, a sleeve having a multiplicity of longitudinal or lateral grooves formed in the outer and/or inner periphery of the sleeve may be employed. In particular, there may be used the above-described stainless steel thin pipe having outer diameter of 5 mm or less to thereby make it possible to obtain superior fixing because the elastic-plastic deformation can easily take place and because a large deformation can occur with the elasticity remaining after the deformation. In this case, a stronger material in comparison to the above-described solid material may be used. Alternatively, the buffer may be a sleeve like cylinder provided at the ceramic side thereof with protrusions readily deformable against the ceramic sleeve, which protrusions may be a ring shape or a spiral shape or a bar shape. Furthermore, the buffer can be metallized on the surface of the roller shaft by flame-spray, welding, plating or the like. It is preferable that the surface thereof may have undulation.

The ceramics may be clearance-fitted to the roller shaft so that the roller shaft and the ceramics may be fitted to each other, or the ceramics may be formed on the outer periphery of the roller shaft by flame-spraying or the CVD method.

In the bearing of the present invention, a plurality of ceramics are placed in dovetail grooves formed in the circumferential direction on the metal bearing stand and the ceramics ar abutted and fixed via the stress buffer from the bearing stand. Furthermore, the above-described stress buffer is made of a material having corrosion resistance against the above-described molten metal. In particular, it is preferable that a graphite sheet having the corrosion resistance against the molten metal is employed.

According to the present invention, the ceramics used in the bearing is pushed and fixed from the edge of the roller shaft by both a metal retaining plate and a spring. It is preferable that the above-described spring is a heat resistant alloy coil spring, more preferably the heat resistant alloy is Cu steel, Ni-Cr steel, Cr-Ni-Co alloy and those in which W, Mo, Ti, Si and/or Nb is included. Furthermore, the ceramics are fixed in the axial direction via a thermal expansion compensating material which preferably has a thermal expansion coefficient larger than that of the roller shaft.

According to the present invention, ceramics exhibiting excellent corrosion resistance, abrasion resistance and sliding property can be reliably fitted to the sliding portion of the roller bearing. Therefore, the service life of the roller bearing can be prolonged in the molten metal plating bath. As a result, a long period of time operation, which is 10 times the conventional operation period of time, of the metal roller shaft can be realized. Therefore, significant effects can be obtained in that the necessity of the frequent interchanging the roller shaft can be eliminated, the manufacturing efficiency can be improved since the long time and continuous operation can be performed and the defective products can be reduced.

Furthermore, since the sleeve can be reliably fitted to the body of the core of the roller for the rolling work, a reliable roller can be obtained.

According to the present invention, the ceramics sintered body exhibiting excellent corrosion resistance against molten metal is used in the sliding portions of both the sleeve and the tip for the die casting machine, with the result that the increase in the amount of abrasion due to the corrosion abrasion can be prevented. In addition, according to the present invention, at least either one of the members is made of a material having solid lubricating property and another member is made of a high strength and hardness ceramic sintered body, so that the friction coefficient can be reduced due to the effect of the solid lubrication (self-lubrication). Therefore, the seizuring and galling can be prevented, and the necessary quantity of the lubricating oil can be reduced to ⅓ of that according to the conventional structure. Furthermore, since the strong and hard ceramics sintered body does not substantially wear and its smooth and flat sliding surface can be semi-permanently maintained, the amount of the abrasion of the solid lubricating material can be reduced to 1/10 of that according to the conventional metal combination.

According to the present invention, the intermediate member which can be elastic-plastically deformed at a level lower than the rupture strength of the ceramic is disposed between the ceramic sintered body and the metal sleeve at the time of fitting the ceramic sleeve to the inner periphery of the metal sleeve. Therefore, even if the machining tolerances for the metal sleeve and the ceramics sleeve are large, a locally excessive stress occurring at the fitting work and in the temperature cycle at the time of the usage can be absorbed by the plastic deformation and the elastic deformation. Therefore, the ceramic can be strongly fixed to the metal sleeve without the cracks or fractures of the ceramic. The above-described structure will enable the same effect to be obtained against an impact load. Therefore, the structure can be preferably employed as a structure in which the ceramic sleeve is fitted to the inner surface of the metal sleeve.

The above-described material having the solid lubricating property is ceramics containing, in their sintered body and in a dispersed manner, a material such as carbon powder or carbon fiber exhibiting excellent solid lubricating property. It is preferable that it is silicon carbide sintered body containing, in its sintered body and in a dispersed manner, the carbon powder the average particle size of which is 50 μm or less or carbon fiber the diameter of which is 150 μm or less by 1 to 70 parts by weight, preferably 10 to 40 parts by weight. A similar effect can be obtained from graphite or fiber reinforced graphite.

As an intermediate member serving as a stress buffer, the above-described material is employed.

According to the present invention, since the ceramics exhibiting excellent corrosion resistance, abrasion resistance and sliding characteristics and having solid lubricating property can be reliably fitted to at least either one of the sliding surface of both the sleeve and the tip. Therefore, the service life which is 10 times the life of the conventional metal sleeve and the tip can be realized. Therefore, the necessity of the frequent interchange of the sleeve and the tip can be eliminated and the manufacturing efficiency can be improved since a continuous operation can be performed.

Furthermore, the ceramics exhibiting significant sliding characteristics are combined to each other, the necessary quantity of the lubricating oil can be reduced to ⅓ of that according to the conventional metal sleeve. Therefore, the cost for the lubricating oil can be reduced and the defects of the mold cavity due to the introduction of the lubricating oil can be prevented.

Other and further objects, features and advantages of the invention will be appear more fully from the following description.

EXAMPLES

Example 1

Figure 1:
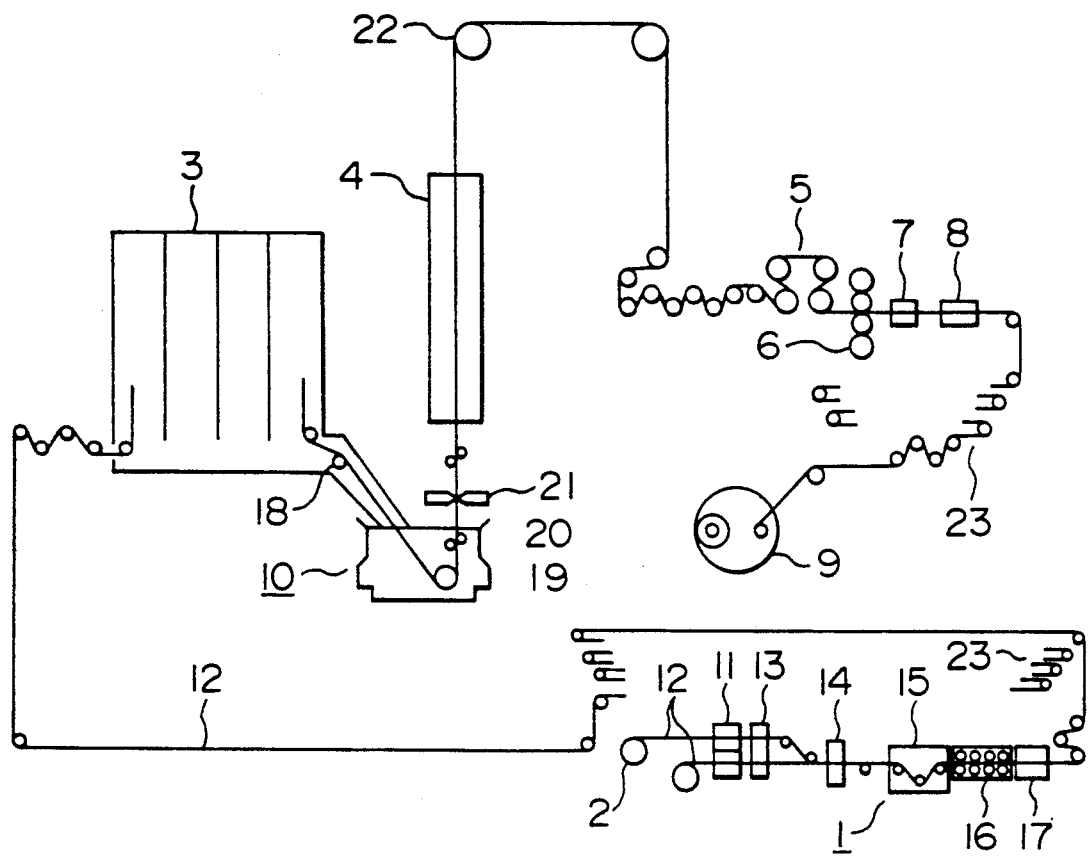
FIG. 1 illustrates a continuous molten zinc plating apparatus according to the present invention.

FIG. 1 illustrates the overall processes performed by a continuous molten metal plating apparatus according to the present invention. Additionally FIG. 1 illustrates steel strips 12 to be subjected to plating which strips were wound onto a pay-off reel 2 entered through a leveller 11, a shear 13, a welder 14, an electrolytic cleaning tank 15, a scraper 16 and a rinsing tank 17 an annealing furnace 3 so as to be annealed. Then, it was plated in a molten metal plating tank (apparatus) 10. A strip 12, which had been immersion-plated in the molten metal plating apparatus 10, was moved at a high speed through a surface adjusting unit 4, a bridle roller 5, a skin pass mill 6, a tension leveller 7, a causticizing device 8 and a looper 23 and is wound up by a tension reel 9. The tension applied to the strip 12 is controlled by a roller 5 and a tension bridle (omitted from, the drawings). The above-described tension is controlled to a constant level in accordance with the amplitude of vibration of the strip 12 measured by a vibration detector disposed just behind a wiping nozzle 21. The tension bridle is disposed to each of the processes.

Figure 2:
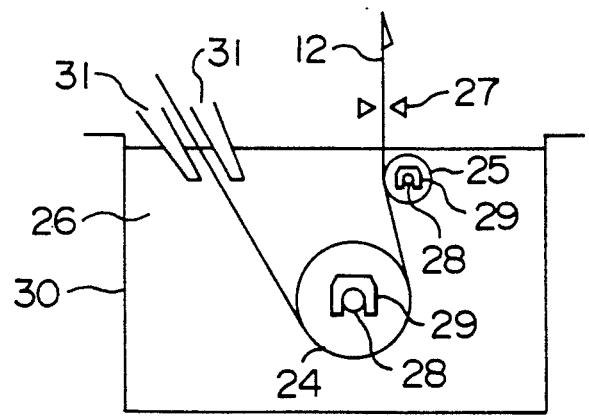
FIG. 2 is a cross sectional view of a galvanizing tank.

FIG. 2 is an enlarged view which illustrates the molten metal plating apparatus 10.

The direction of the strip 12 supplied via snouts 31 is changed by a sink roller 24 in a plating tank 30 and the movement of the strip 12 was stabilized by a support controller 25, the strip 12 being passed at high speed of 50 to 100 m/minute. The strip 12, drawn out from a plating bath 26, was applied with high velocity gas blown through wiping nozzles 21 disposed on both sides of the strip 12 so that the thickness of the plating layer was adjusted by both the gas pressure and the angle at which the gas was applied.

The rolls 28 and the roller bearing shells 29 of the support roller device 25 and the sink roller device 24 used in the molten metal bath are lubricated by the molten metal. Therefore, the bearing shell 29 for the roller is in the form of a sliding bearing structure.

As a result of an observation of the state of the abrasion of the conventional sink roller and bearing, it has been found that the abrasion of the roller and bearing is formed in a direction designated by an arrow shown in FIG. 2, that is, in the direction of the vector of the force occurring when the strip 12 is bent by the sink roller 24.

Figure 3:
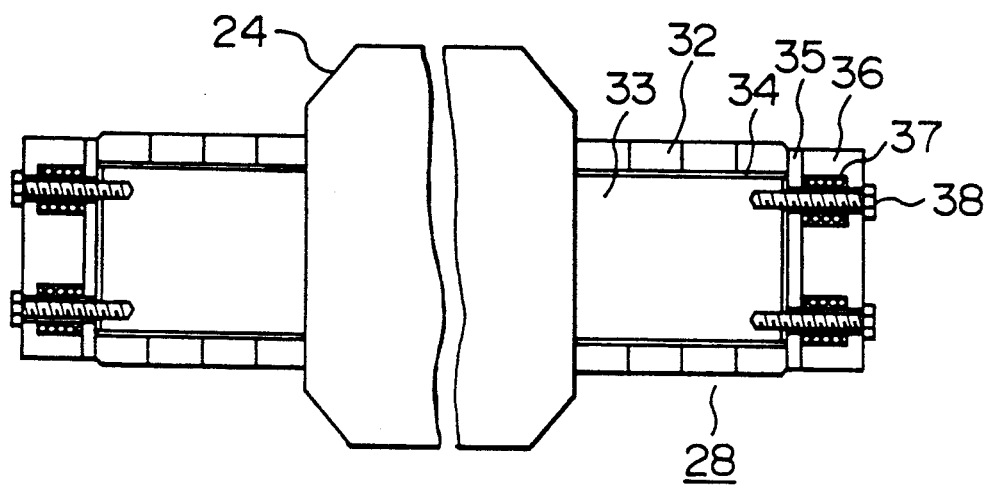
FIG. 3 is a cross sectional view of a sink roll.

FIG. 3 is a cross sectional view which illustrates the sink roller 24 according to the present invention. Sialon ceramics were employed to serve as ceramics 32 divided into four sections and fitted to the roller shaft 33 since the sialon ceramics exhibit an excellent corrosion resistance against molten metal, an excellent strength and satisfactory high hardness. The sialon ceramics are expressed by a chemical formula $Si_6-zAl_zO_zN_{8-z}$, where z is optionally selected in the range of 0 to 4.2, the above described sialon ceramics being a so-called β sialon. According to this example, sialon powder, the composition of which was expressed by z=0.5, was used. A small quantity binder was added to the sialon powder before it was wet mixed in methanol and granulated by a spray dry method. Then, four cylindrical bodies the outer diameter of each which was 210 mm, the inner diameter of which was 145 mm an the length of which was 50 mm were formed by a pressing method under cold hydrostatic pressure. The four cylindrical bodies were sintered at 1750° in a nitrogen atmosphere. The sintered body is subjected to finish working so that the outer diameter was made to be 150 mm, the inner diameter was made to be 118 mm and the length was made to be 40 mm. The surface roughness of the outer sliding surface is set to Rmax 0.8 μm.

Example 1

Figure 4:
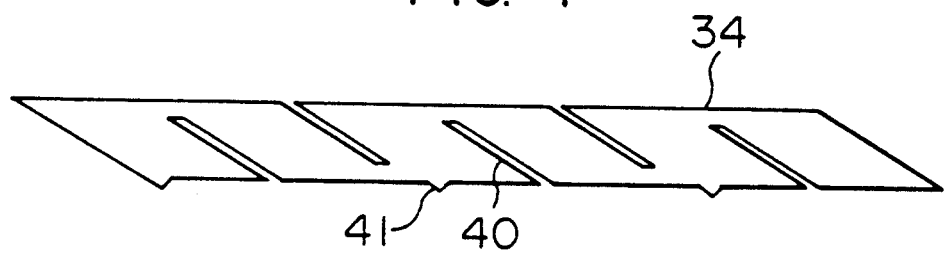
FIG. 4 illustrates an intermediate member serving as a stress buffer.

The roller shaft 33 was made by AISI 316 of a stainless steel type having a relatively excellent corrosion resistance, the roller shaft 33 having the outer diameter of 111.04 mm. As a buffer 34 there is used a copper plate annealed to have a yielding point of about 5 kgf/mm² and a thickness of 3.2 mm, the copper plate having, as shown in FIG. 4, a slit 40 and a projection 41. The copper buffer plate 34 is wound around the cylindrical roller shaft 33 which corresponded to the ceramics as shown in FIG. 3. Then, the cylindrical sialon sintered body was inserted onto the roller shaft 33, and the ceramics 32 was pushed in the axial direction by a retaining plate 35, a cap 36, a spring 37 manufactured by Inconnel and a screw bolt 38 by a force of about 600 kgf so as to fix it so that the penetration of molten zinc into the space between the ceramics 32 and the roller shaft 33 was prevented.

The sialon ceramics, copper, the stainless roller shaft had respectively the thermal expansion coefficients of $3.2 \times 10^{-6}/°$ C., $17 \times 10^{-6}/°$ C., and $17 \times 10^{-6}/°$ C. Therefore, when the roller 28 shown in FIG. 3 was immersed in molten zinc the temperature of which is 450° C., the inner diameter of the sialon ceramics 32 was 118.17 mm, while the outer diameter of the stainless steel roller shaft 33 was 111.84 mm, causing a gap of 3.16 mm to occur. Therefore, the difference of 0.06 mm from the above-described gaps serves as a deformation tolerance for the copper buffer plate 34 to be elastic-plastically deformed. Since the amount of the plastic deformation is about 2%, the slit 40 was provided to have at least a size which corresponds to the volume exceeding 2%. As a result, the buffer 34 was elastic-plastically deformed so that the roller shaft 33 and the ceramics 32 were positioned in hermetic contact with each other at the usage temperature. Therefore, no cracks occurred in the ceramics 32 due to the fitting. The reason for this is considered to reside in that there was a space in the gap for the buffer 34 to deform at the temperature of usage. In the case where the buffer plate 34 made of copper was disposed between the cylindrical ceramics 32 and the roller shaft 33, zinc which is wetted by copper is apt to penetrate into the gap. If the space is filled with zinc, there is a fear that cracks of the ceramics 32 will occur. Therefore, it is preferable that a buffer made of a material capable of preventing the penetration of zinc be provided at the end portion, the preferred material is a stainless steel wire.

Figure 5:
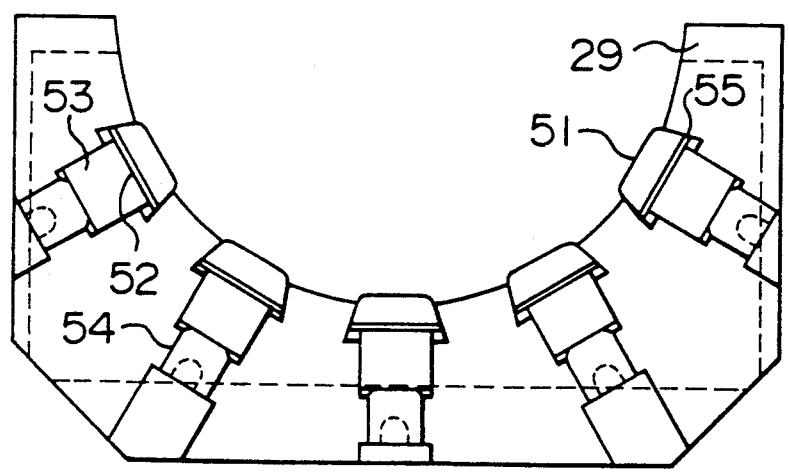
FIG. 5 is a cross sectional view of a bearing.

SiC-C composite ceramics were granulated in such a manner that 25 parts by weight of graphite powder the average particle size of which was 10 μm were added to 100 parts by weight of SiC powder the average particle size of which was 3 μm so as to be wet-kneaded in a small quantity binder and methanol before drying. Then, the above-described ceramics were granulated by a liekaiki process. Then, the ceramic grains having been formed by using a kneader was formed in a compressed disc-like shape having an outer diameter of 100 mm or more and the disc was sintered at 2100° C. or more in a vacuum pressure through a hot press process. The sintered body was ground, cut and polished so that a trapezoidal block was obtained. In order to enable the SiC-C composite ceramics 51 to be fitted onto the inner surface of the stainless steel bearing 29, dovetail groove 55 and thread holes were formed. That is, as shown in FIG. 5, each of the SiC-C composite ceramics 51 was placed within the dovetail groove 55 and the same was fixed, from the rear side thereof, by a stainless steel retaining plate 53 and a stainless steel screw 54 via a carbon sheet 52.

Figure 6:
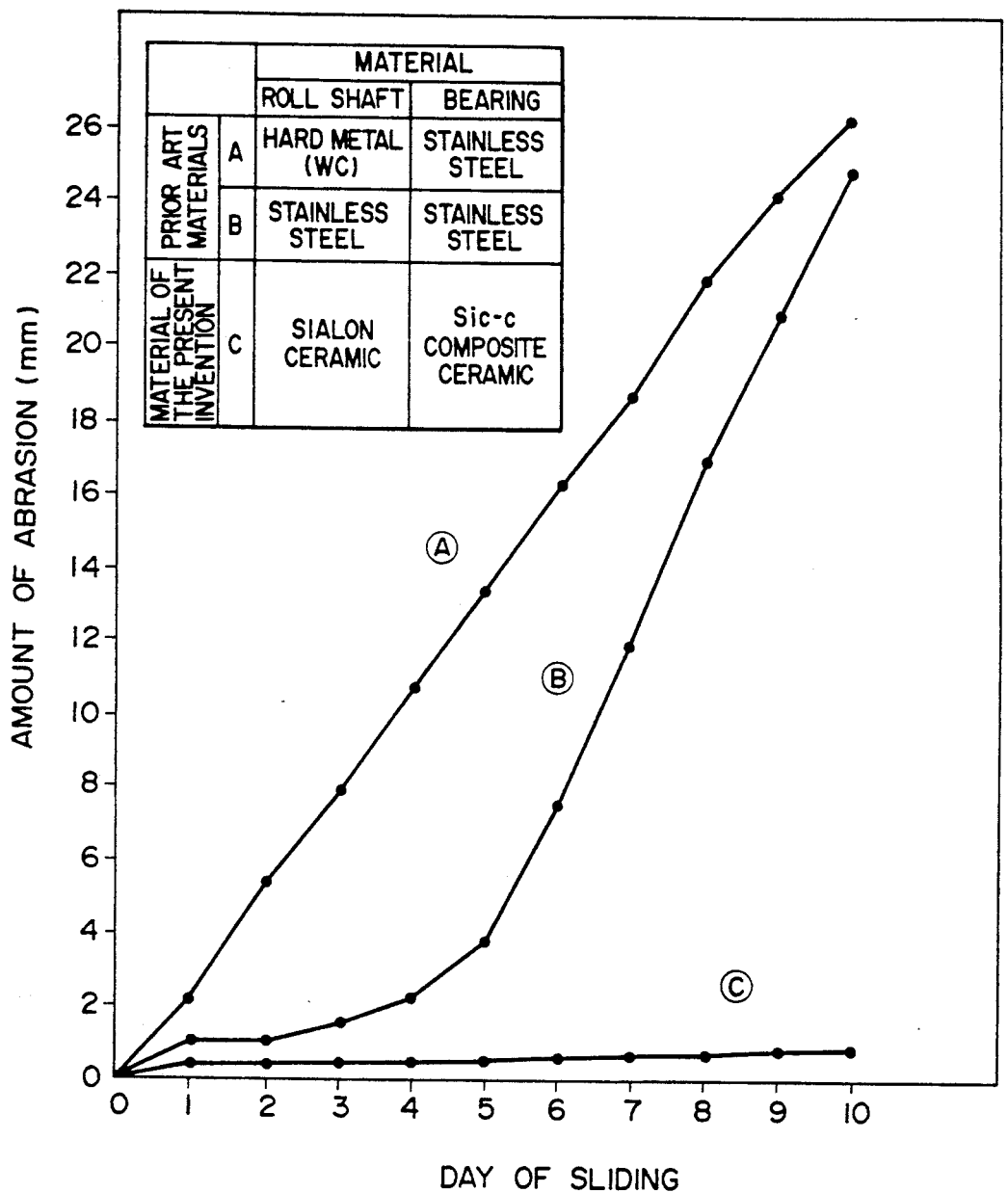
FIG. 6 is graph which illustrates the relationship between the quantity of abrasion and days in which the sliding is performed.

Then, by use of this roller and the bearing there were effected sliding tests in a molten zinc bath. The temperature of the zinc bath was 450° to 480° C. and the force for pushing the roller bearing was set to 1300 kgf. As a result, as shown in FIG. 6, the amount of the abrasion was not more than 1 mm after the rotation sliding for 10 days, that is, the abrasion was reduced to 5% or less of that according to the conventional roller bearing. The conventional roller and bearing subjected to the rotation sliding test were arranged to have the cylindrical bearing and the roller shaft the structure of each of which were different from the structure according to this example, the roller shaft being arranged to have the diameter of 150 mm and the length of 160 mm.

Example 2

A small bearing and a roller having a roller shaft the diameter of which was 50 mm and the sliding length of which was 70 mm were subjected to the sliding test similar to Example 1. The outer periphery of the roller shaft and the ceramics fitted to the inner periphery of the bearing were made of the same materials as those according to Example 1. Although the structure of the bearing is the same as that of Example 1, there is used an integrated cylindrical shape formed by integrating the sectioned bodies shown in FIG. 3 with respect to a roller shaft since the roller shaft according to this example is small in size. The method of fitting by using a copper buffer as an intermediate member was made to be similar to that of Example 1. The buffer thus employed was one piece having a large width and was wound around the roller shaft.

A satisfactory sliding test results were obtained such that the results of the sliding test were similar to those according to Example 1 and no cracks occur in the ceramics.

Example 3

A sink roller and a bearing according to Example 1 were used in a continuous plating operation in molten aluminum the temperature of which was 680° C. As a result, although abrasion depth due to the abrasion in the conventional steel roller and bearing was about 15 mm for 15 days usage, an abrasion depth due to the abrasion in the roller and bearing according to this example was about 0.3 mm. Therefore, the abrasion of the example was reduced to 1/30 of that according to the conventional roller and bearing. Furthermore, this effect was confirmed in that the abrasion depth was 1 mm or less in a test carried out in such a manner that the roller and bearing according to this example were continuously used for 12 days without replacing this roller and bearing.

In order to confirm another effect obtainable from the present invention, the roller and bearing, which had been used for 12 days, were taken out, and the ceramics of the bearing were shifted in a direction of the circumference by an angular degreed of ⅛ of the circumference. Then, the roller and bearing were again used. As a result, any excessive abrasion was not observed. The quantity of the abrasion after the use for 12 days was not more than 1 mm which is the value similar to that obtained after the first usage. It was found that ceramics was able to be repeatedly used 8 times if the above-described rotation of the ceramics was performed. Therefore, the expensive ceramics can be efficiently used if the grinding of the ceramics was performed.

Since in the molten zinc plating and aluminum plating the sink roller was excessively worn in the case of the conventional structure, it was exchanged every week by a same sink roller. However, according to this example, the above-described plating operations can be performed by one sink roller. Furthermore, since the wear of the roller can be satisfactorily minimized, the period necessary to exchange can be prolonged to more than 20 days or one month.

In addition, the above-described looper 23 may be omitted from the construction.

Example 4

According to Example 1, the structure according to the present invention was applied to the sink roll. Then, the results obtained when the structure according to the present invention was applied to a support roller for use in the continuous molten metal bath, will be described.

The material of ceramics and the method for manufacturing the ceramics were the same as those of Example 3. The test conditions were set in such a manner that the routine work operation was performed in a molten zinc bath of 460° C., and the roller and the bearing were taken out after the use for 12 days so as to measure the abrasion in the ceramic sliding portion. As a result, an effect according to the present invention was confirmed such that the depth due to the abrasion was not more than 0.3 mm.

Example 5

Similarly to Example 1, a sleeve made of a sialon sintered body was used to make the sink roll, while SiC—graphite sintered body was used to make a bearing. The difference from Example 1 lies in that a wire having a diameter of 1 mm and made of pure copper was wound around the overall portion, at which the ceramic sintered body exists, in such a manner that the neighboring wire portions were in contact with each other, and then the ceramic sleeve was inserted. In the gap formed between the ceramic sleeve and the outer periphery of the roller shaft the copper wire are, at this time, in linear contact therewith. However, the copper wire plastically and elastically deformed in the molten zinc plating bath the temperature of which is 450° C., so that a plane contact is obtained. Therefore, it is confirmed that no crack occurred in the ceramics and that a strong fitting can thereby be obtained.

Example 6

An integrated roller for a rolling work was manufactured in such a manner that each of sleeves made of a hard metal alloy of a Co and Ni sintered body containing WC, TiC, TaC, Mo$^2$C or VC and made of SKH9 (JIS) which is high speed tool steel was shrinkage-fitted or cold fitted to a roller body made of a forged steel containing C of 0.3 to 1 wt % as a roller core. A Ti wire serving as an intermediate member was wound around the overall portion between the sleeve and the core. As a result, it was confirmed that a strong fitting can be obtained without cracks of the roll.

The thus obtained roller can be used as a work roll for hot rolling and cold rolling. A material having a strength which is not deteriorated at a usage temperature may be employed as the intermediate member in taking the temperature of the usage into consideration.

Therefore, it is preferable that material of Au, Ag, Al and Cu type materials the melting point of which is relatively low are employed for making the cold rolling roll. On the contrary, it is preferable that Ta, Ti, Pd and stainless steel are employed for making the hot rolling roll. The above-described material must be annealed completely so as to become mild in hardness before the use.

Example 7

Sleeves of two kinds having different diameters were shrinkage-fitted or cold fitted. One of the sleeves was constituted by a metal sintered body and another was a ceramic sintered body or a metal sintered body. That is one sleeve was made of the above-described hard and brittle material such as the hard metal alloy or high speed steel. The sleeve was fitted onto a smaller diameter portion of a shaft via an intermediate member made of a metal selected to meet the purpose. The space between the two members was calculated depending upon the difference in the thermal expansion coefficient between the two members so that the intermediate member may be in 100% plane contact with the two members at the temperature of the usage. However, if a certain space is not provided which allows the intermediate member to deform at the temperature of the usage, one of the members relatively weaker may be broken. Therefore, a space which allows the intermediate member to slightly deform must be provided.

According to this example, it was confirmed that a satisfactory fitting was realized without occurrence of fracture. The cylindrical member employing the structure of this example of which the inner side is applied with the ceramics can be used as a melting apparatus and a die casting stoke plunger sleeve. The cylinder constituted by fitting the two kinds of metals can be used to make a variety of cylinders and a special pipe.

Example 8

Similarly to Example 1, an AISI316 pipe having an outer diameter of 2.98 mm and the inner diameter of 2 mm was, at a pitch of 6 mm, wound around an AISI316 roller shaft 33 having an outer diameter of 122.18 mm. The two ends of the pipe were spot welded to the roller shaft. The outer diameter of the roller shaft, to which the pipe had been wound, became 128.18 mm, which shaft was then inserted in a sialon sintered body sleeve the inner diameter and the outer diameter of which were 128.7 mm and 150 mm respectively. In this case, the amount of an elastic plastic deformation of the AISI 316 pipe immersed in 2 molten Zn bath of 460° C. was 10 μm and the pressure generated from the above-described structure was 0.5 kgf/mm$^2$, which pressure value was one-sixth the tolerance pressure Pmax of 3 kgf/mm$^2$ regarding the sialon sleeve so that no problem occurred with respect to cracking.

The roller shaft thus manufactured was, similarly to Example 1, subjected to rotation sliding test. The quantity of the abrasion was similar to that according to Example 1. It was also confirmed that a stable fitting was realized since the AISI 316 pipe showed excellent resilience at the temperature for the usage.

Example 9

An AISI 316 cylindrical member having a thickness of 2 mm and an inner diameter slightly smaller than 111.5 mm and being provided on the outer periphery thereof with angular projections having a terminal angle of 60° and a height of 1 mm in the circumferential direction with a pitch of 6 mm was fitted to an AISI 316 roll shaft 33 having an outer diameter of 111.5 mm in a manner similar to Example 1. Then, similarly to Example 1, a sialon sleeve portion having an outer diameter of 150 mm and an inner diameter of 116 mm was fitted to the AISI 316 sleeve portion in a manner similar to Example 1. In the fitting, a shrinkage fitting allowance at 460° C. was about 50 μm so that pressure generated therefrom becomes 1 kgf/mm². Since this pressure level was ⅓ of the tolerance stress Pmax of 3 kgf/mm², which was the allowable stress for the ceramic sleeve, no problem occurred.

The thus manufactured roller shaft was subjected to the rotation sliding test similarly to Example 1, the quantity of the abrasion of the roller shaft was similar to Example 1. According to this example, since the buffer had certain corrosion resistance against molten zinc, the damage of the shaft portion was improved in comparison to Example 1. Furthermore, the strength of the fitting at high temperature was satisfactorily high.

Example 10

The AISI 316 roller shafts obtained according to Example 8 were used in both the sink roller and the support roller so as to be installed in the molten zinc plating apparatus according to Example 1. The apparatus was continuous operated for 10 days in such a manner that a steel strip having a thickness of 0.8 mm was moved forwards at a speed of 90 m/minute and a Zn plating layer of 100 g/m² was formed on both sides of the steel strip. The tension in the direction of the movement of the steel strip was made constant and the blowing of a gas through the wiping nozzle 21 was performed substantially uniformly and the vibration of the steel strip onto which the molten zinc had been applied was substantially prevented. Since in general, the steel strip to which the molten zinc has been plated is moved upwards to a height of about 5 m so as to be cooled, slight vibration of the roller shaft is apt to directly because the vibration of the steel strip. However, according to this example, the vibration of the steel strip was able to be prevented satisfactorily.

Example 11

In the production of Example 10, the thickness of the Zn plating was made to be 40 g/m² or 30 g/m² and the steel strip was continuously manufactured for one week. According to this example, the abrasion of the roller shaft was substantially prevented and the vibration of the steel strip was satisfactorily minimized. Therefore, a Zn-plated steel strip the thickness of which was substantially uniformed was obtained. In this case, the variations in both the tension applied to the steel strip and the gas-blowing condition was very small, that is, it was within 10%.

Example 12

The ceramics 32, which was divided into four sections in Example 1, was not divided in this example. In this example, a ceramic sintered body containing 30 wt % in total of both graphite having an average particle size of not more than 50 μm and carbon fiber having a diameter of 150 μm was manufactured. The sintered body had an inner diameter of 112 mm, which was substantially the same as the outer diameter of the roller shaft 33, and a thickness of 15 mm. The thus provided sintered body was inserted into the roller shaft and was fixed to the roller shaft by projections inserted in notches formed in the ends of the sintered body which projections were formed in the an abutting plate screw-fixed to the shaft. As a result, the rotation of the ceramic was prevented.

The same bearing according to Example 1 was used and the molten zinc plating was similarly performed for 10 days. The results was, similarly to Example 1, satisfactory such that the abrasion was substantially prevented, the service life of it was satisfactory long and the vibration was also satisfactorily minimized.

Example 13

Figure 9:
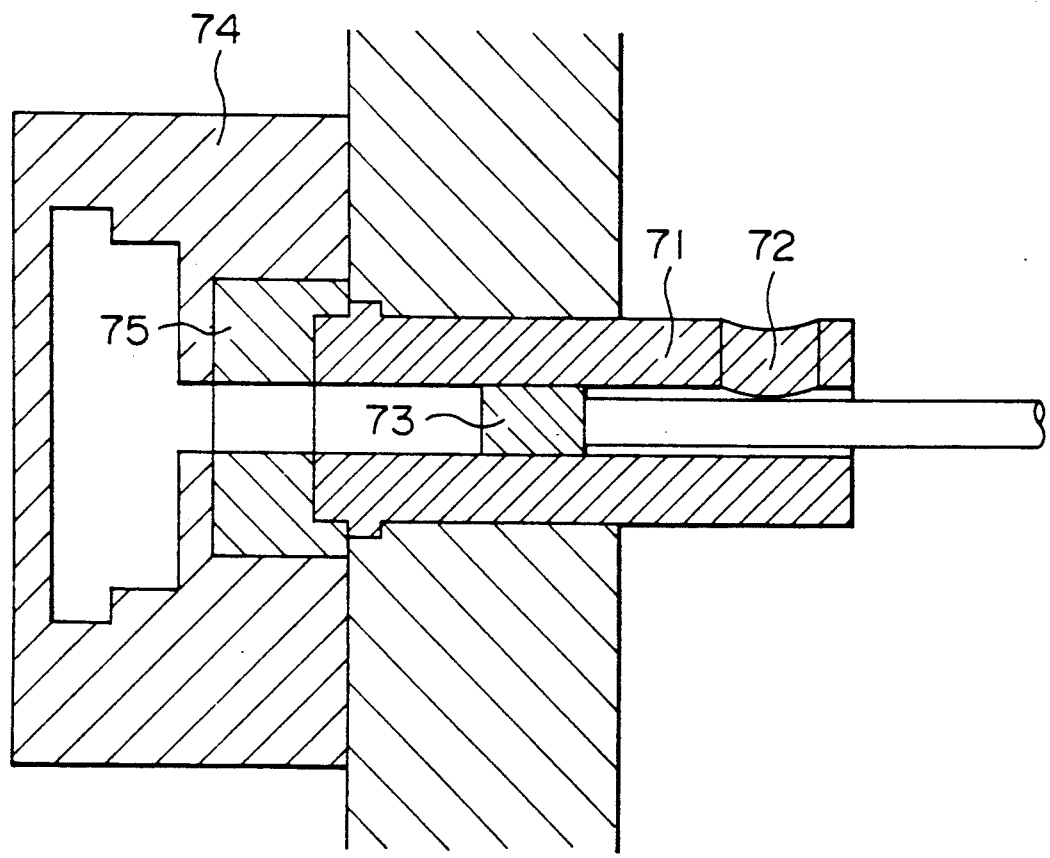
FIG. 9 is a structural view of the sleeve and the tip according to the present invention.

FIG. 9 illustrates the schematic overall structure of an installed sleeve and a tip provided in an die casting machine according to the present invention. Molten aluminum was poured into the sleeve 71 through a gate 72 formed in the sleeve 71 and was pressure-introduced into a metallic mold 74 through a spool bush 75 while being pushed by a tip 73. In conventional metal sleeve and tip there occurred the abrasion and the corrosion in the portion just below the gate, scratching damage and seizure due to the galling with the tip in a range of 100 mm distant from the outlet surface, scratching damage due to the galling with the sleeve with respect to the tip, and in particular an excessive corrosion abrasion in the range of 10 mm distant from the end portion of the tip.

Figure 7:
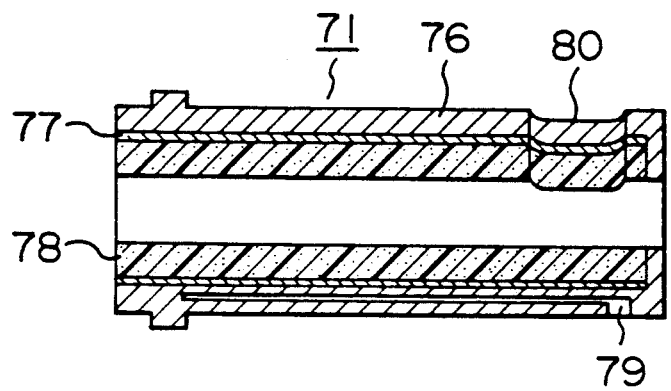
FIG. 7 is a cross sectional view of a sleeve according to the present invention.

FIG. 7 is a cross sectional view which illustrates the sleeve 71 according to the present invention. According to this example, sialon ceramics were employed to serve as the sleeve 78 made of ceramic sintered body and fitted to the inner side of the metal sleeve 76, which sialon ceramics have an excellent corrosion resistance against molten metal, excellent strength and satisfactory hardness. The sialon ceramics can be expressed by a chemical formula $Si_6-zAl_zO_zN_{8}-z$, where z may be optionally selected in a range of 0 to 4.2, the above-described sialon ceramics being a so-called β sialon. According to this example, sialon powder, the composition of which can be expressed by z=0.5, was used. A small quantity binder was added to the sialon powder before it was wet-kneaded in methanol and granulated by a spray dry method. Then, it was pressure-compacted to form a sleeve-like shape by a cold hydrostatic pressing method. A pouring gate 80 was formed before the sintering process. The sintered body was finished to have an outer diameter of 81 mm, an inner diameter of 65 mm and an length of 320 mm. The surface roughness of the inner sliding surface was set to be Rmax: 2 μm.

The metal sleeve 76 was made of SKD-61 of a die steel type exhibiting a relatively high corrosion resistance so that it had an inner diameter of 82.6 mm, an outer diameter of 104 mm, and a gate 80. A groove 79 through which cooling water flowed was formed by arranging the metal sleeve 76 to be a double structure, the cooling water groove 79 being provided over the entire surface of the metal sleeve 76.

An intermediate member 77 serving as a buffer was constituted by an annealed copper wire having an yielding point of 5 kgf/mm² and the diameter of 1.0 mm. The intermediate member 77 was intimately wound around the ceramic sleeve 78, and the ceramic sleeve was inserted into the metal sleeve 76 which had been heated and expanded at least 500° C. Then, the temperature was gradually lowered so that the intermediate member 77 was shrinkage-fitted. At this time, the copper wire 77 was uniformly and sufficiently brought into intimate contact with the fitting surface of the metal sleeve 76 and that of the ceramic sleeve 76 because of both the plastic deformation and the elastic deformation by a degree from the diameter of 1.0 mm to 0.8 mm. Therefore, the fitting without non-uniform contact was realized so that neither cracks nor fracture occurred in the ceramic sleeve 78. Furthermore, a space, in which the copper wire 77 can be deformed due to the thermal expansion, was formed due to the difference in the thermal expansion.

Figure 8:
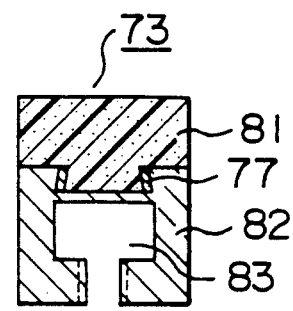
FIG. 8 is a cross sectional view of a tip according to the present invention.

FIG. 8 is a cross sectional view of the tip 73 according to the present invention. According to this example, SiC-C composite ceramics 81 exhibiting excellent solid lubricating property and corrosion resistance against molten metal was fitted to the front portion of the tip at which excessive corrosion and abrasion take place due to the molten metal. The SiC-C composite ceramics 81 were granulated in such a manner that 25 parts by weight of graphite powder the average particle size of which was 10 μm were added to SiC powder the average particle size of which was 3 μm so as to be wet-kneaded in a small quantity binder and methanol before drying. Then, the above-described ceramics were granulated by a kneader. Then, the ceramics were compacted, by using a mechapress, to have a disc-like shape having the thickness of 30 mm and the outer diameter of 100 mm or more and was sintered at 2100° C. or more in a vacuum pressure. The sintered body was ground, cut and polished so that the disc-like SiC-C composite ceramics 81 having a fastening projection as shown in FIG. 8 was manufactured.

A metal tip 82 was made of SKD-61 of die steel type. The outer diameter of the metal tip 82 was the same as that of the SiC-C composite ceramics 81. Furthermore, a recessed portion for fastening the SiC-C composite ceramics 81 and a counter bore 83 for passing cooling water were formed in the metal tip 82.

An intermediate member 77 was made of an annealed copper wire having a diameter of 1.0 mm similarly to the case of the sleeve shown in FIG. 7. The intermediate member 77 was wound around the fastening projection of the SiC-C composite ceramics 81 and was shrinkage-fitted to the fastening recess formed in the metal tip 82. Both the amount of the deformation of the intermediate member 77 at the time of the shrinkage-fitting and the shrinkage-fitting conditions were set to be the same as those for the above-described sleeve. As a result, the SiC-C composite ceramics 81 was able to be fitted to the metal tip 82 without cracks and fractures.

The thus structured sleeve and the tip were subjected to evaluations by using a 350-tondie casting machine, with the result that no abrasion was found in the inner sliding surface of the ceramic sleeve 8 after the 100,000 shots. The amount of the abrasion of the SiC-C composite ceramics tip 11 was reduced to not more than 0.05 mm, which is the half or less of that of the conventional structure.

Furthermore, no seizuring occurred even when the quantity of lubricating oil was reduced to ⅓ or less and excellent sliding characteristics were confirmed. As a result, the quality of the die cast products was improved.

Furthermore, in another case where a sheath pipe made of AISI316 stainless steel used as the intermediate member for fitting both the above-described sleeve and the tip was wound to the entire surface of the fitting portion, it was confirmed that more desirable fitting was obtained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. A molten metal plating apparatus comprising a roller rotatably supported by a bearing in a molten metal bath, said roller having a shaft sliding portion, said bearing having a bearing sliding portion, one of the shaft sliding portion or the bearing sliding portion being formed of ceramic sintered bodies, another of the shaft sliding portion or the bearing sliding portion being formed of a ceramic sintered body including a solid lubricating material, and wherein the ceramic sintered body of the bearing sliding portion is disposed within dovetail grooves formed on an inner periphery of a metallic member having a least a semicircular inner periphery and being fixed in a direction toward the roller.

2. A continuous molten metal plating apparatus comprising a sink roller and a support roller, each of said sink roller and said support roller being rotatably supported by a bearing in a molten metal bath, each of said sink roller and said support roller having a shaft sliding portion, said bearing having a bearing sliding portion, one of the shaft sliding portion or the bearing sliding portion being formed of ceramic sintered bodies with respect to at least one of the sink roller and the support roller, another of the shaft sliding portion or the bearing sliding portion being formed of a ceramic including a solid lubricating material with respect to at least one of said sink roller or said support roller, and wherein the ceramic of the bearing sliding portion is disposed within dovetail grooves formed on an inner periphery of a metallic member having a least a semicircular inner periphery and being fixed in a direction toward the roller.

3. A continuous molten metal plating apparatus comprising a roller rotatably supported by a bearing in a molten metal bath, said roller having a metal body, a shaft sliding portion, a sleeve of a ceramic sintered body fitted on the shaft sliding portion, and an intermediate metal member interposed between said shaft sliding portion and said sleeve, said intermediate metal member being deformed at a stress level lower than a rupture strength of the ceramic sintered body, the intermediate metal member being elastic-plastically deformed at a temperature of the usage thereof by a difference in thermal expansion between the intermediate metal member and the ceramic sintered body, the intermediate member being having a space, the intermediate member being deformed within said space, said bearing being provided with a sliding portion formed of a ceramic sintered body including a solid lubricant, and wherein the ceramic sintered body of the bearing sliding portion is disposed within dovetail grooves formed on an inner periphery of a metallic member having a least a semicircular inner periphery and being fixed in a direction toward the roller.

4. A continuous molten metal plating apparatus comprising a sink roller and a support roller, each of said sink roller and said support roller being rotatably supported by a bearing in a molten metal bath, each of said sink roller and said support roller having a metal body and a shaft sliding portion, said bearing having a sliding portion, the shaft sliding portion of either said sink roller or support roller being provided with a sleeve formed of a ceramic sintered body fitted on the shaft sliding portion through an intermediate metal member interposed between the shaft sliding portion and the sleeve, said intermediate metal member being deformed of a stress level lower than a rupture strength of the ceramic sintered body, the intermediate metal member being elastic-plastically deformed at a temperature of the usage thereof by a difference in thermal expansion between the metal body and the ceramic sintered body, the intermediate metal member having a space between the shaft sliding portion and the sleeve, said intermediate metal member being deformed within said space, said sliding portion of the bearing being formed of a ceramic sintered body including a solid lubricant, and wherein the ceramic sintered body of the sliding portion of the bearing is disposed within dovetail grooves formed on an inner periphery of a metallic member having a least a semicircular inner periphery and being fixed in a direction toward the roller.

* * * * *